(12) United States Patent
Bitzer et al.

(10) Patent No.: US 8,439,370 B2
(45) Date of Patent: May 14, 2013

(54) STAIR-CLIMBING DEVICE

(75) Inventors: Paul-Gerhard Bitzer, Albstadt (DE);
Franz Scheck, Balingen (DE); Michael Urso, Tuttlingen (DE); Wolfgang Hantke, Baindt (DE)

(73) Assignee: Ulrich Alber GmbH, Albstadt (DE)

( * ) Notice: Subject to any disclaimer, the term of this patent is extended or adjusted under 35 U.S.C. 154(b) by 38 days.

(21) Appl. No.: 13/086,612

(22) Filed: Apr. 14, 2011

(65) Prior Publication Data

US 2011/0260417 A1    Oct. 27, 2011

(30) Foreign Application Priority Data

Apr. 27, 2010  (DE) .................. 10 2010 016 655
Sep. 23, 2010  (DE) .................. 10 2010 037 729

(51) Int. Cl.
*B62B 5/02*       (2006.01)
(52) U.S. Cl.
USPC ............ 280/5.2; 180/8.1; 180/8.2; 180/8.7
(58) Field of Classification Search .............. 180/7.1, 180/8.1, 8.2, 8.7; 280/5.2
See application file for complete search history.

(56) References Cited

U.S. PATENT DOCUMENTS 7,011,171 B1 *   3/2006   Poulter .................. 180/8.2

FOREIGN PATENT DOCUMENTS

DE   29721477   5/1999
DE   19912932   8/2000

\* cited by examiner

*Primary Examiner* — Kevin Hurley
*Assistant Examiner* — Marc A Scharich
(74) *Attorney, Agent, or Firm* — RatnerPrestia

(57) ABSTRACT

A stair-climbing device including a support unit, a climbing unit driven by a motor and a control unit for controlling operation of the climbing unit, wherein a detection unit is provided for detecting the current position of the support unit with respect to one or several steps of a stair which includes at least one non-contact sensor, wherein the detection unit provides signals to the control unit, which signals contain information about the current position of the support unit with respect to one or several steps of the stair, and wherein the control unit is adapted to control operation of the climbing unit depending on signals of the detection unit.

20 Claims, 15 Drawing Sheets

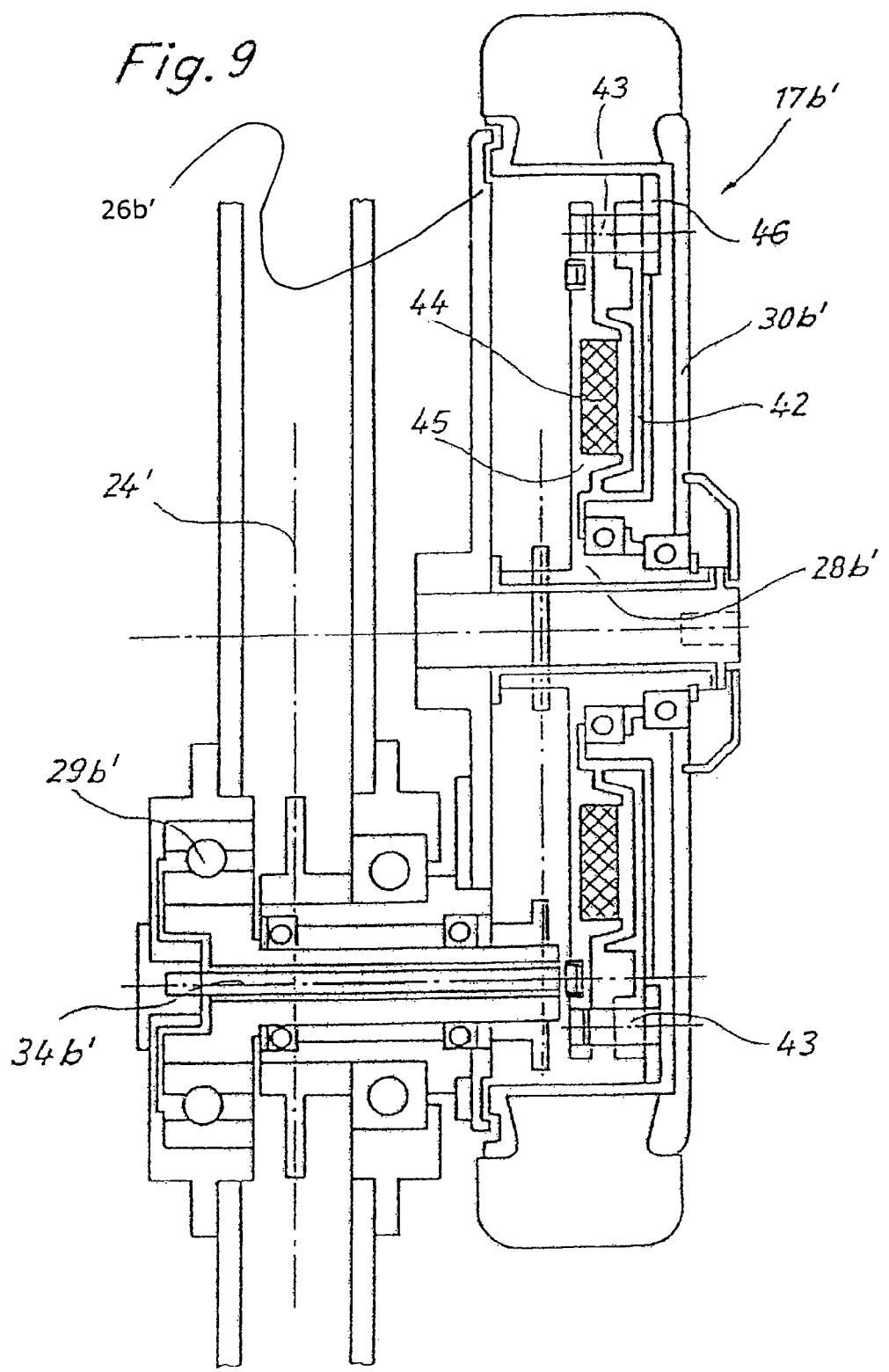

STAIR-CLIMBING DEVICE

FIELD OF THE INVENTION

The invention relates to a stair-climbing device, for instance a stair-climbing device suitable for wheeled vehicles, such as wheelchairs, said stair-climbing device having a support unit and a climbing unit attached to or connected to said support unit, wherein the climbing unit comprises at least one climbing element which can be driven by a drive motor and is designed such that it can get in contact with the next step of a stair and lift or lower the stair-climbing device on the next step. Said stair-climbing device also comprises a control unit for controlling the operation of the climbing unit.

BACKGROUND OF THE INVENTION

Stairs constitute a permanent problem specifically for wheelchair drivers and people with impaired mobility. A stair-climbing device as mentioned above, for example, provides the possibility that an assisting person can transport a wheelchair driver or a person with impaired mobility upstairs or downstairs without particular physical effort merely with the assistance of such stair-climbing device. In order to achieve this, such stair-climbing device can be detachably mounted to a wheelchair, provided that the support unit is not designed as a part of the wheelchair as such. Together with the wheelchair, the stair-climbing device is driven to the first step of a flight of stairs. An assisting person tilts the stair-climbing device together with the attached wheelchair towards his or her direction in a position of balance. When the ideal tilting position is reached, the assisting person only feels a minimum force in a forward or rear direction. Upon operation of the climbing unit of the stair-climbing device, a climbing element now gets in contact with the upper surface of the next step and lifts the stair-climbing device on the next step. This operation is repeated until the stair-climbing device has reached the topmost step of the stair. Climbing down is there effected in an analog way in the same manner.

Conventional stair-climbing devices have the disadvantage that the climbing operation is effected in a jerky manner. An operator therefore during the climbing operation has to balance load change reactions which due to the fact that they occur quickly, that means within a short period of time, are clearly sensible.

The stair-climbing device according to DE 199 12 932 C1 deals with this problem such that the climbing unit can be operated with varying propulsion speeds, wherein the propulsion speed shortly before contact of a climbing element on the surface of the next step is reduced as compared with a predetermined propulsion speed so that a soft touchdown is achieved and after the touchdown on the next step the propulsion speed is increased again to the first predetermined propulsion speed.

However, even in case of this concerning its safety features considerably improved stair-climbing device operation errors cannot be excluded. An operation error could be that the climbing operation is started by an operator when the stair-climbing device is in a position which is not suitable. Such unsuitable position for instance could be if the stair-climbing device is too remote from the next step or is skewed with respect to a next step in a too large angle.

DE 297 21 477 U1 discloses a stair-climbing device which is designed such that it always rests on two steps, namely either on two adjacent steps or, in case of narrow and wound stairs, on one and the second next step. This is intended to unburden the operating person as far as physical efforts are concerned so that only guiding and steering operations are to be performed.

In case of this known stair-climbing device, on the left hand side and right hand side of the rear side touch sensors in the form of contact strips are attached which are operated upon contact with the next higher edge of a step and thereby activate the driving source for the next climbing operation.

Furthermore, touch sensors can be attached at the climbing elements which ensure that each climbing step starts from a defined position of the climbing structure and ends at a defined position.

The climbing operation of this known stair-climbing device occurs practically without tilting movements according to operation. Furthermore, it comprises climbing means which do not allow displacement on the step of a stair during operation. These climbing means, however, are very complex. Furthermore, such climbing systems which are continuously in engagement with a plurality of steps so that a crawler-like climbing operation is effected raise problems concerning specific geometries of stairs, specifically spiral staircases and furthermore have large structural dimensions.

SUMMARY OF THE INVENTION

In addition to the specific field of use of the stair-climbing device according to the present invention for wheeled vehicles, such as wheelchairs, the invention also comprises any other stair-climbing devices which are suited to transport goods or persons on stairs, with or without being operated by an assisting person as an operator.

The technical problem underlying the present invention is to improve a stair-climbing device of the kind mentioned above in so far as to avoid the before mentioned security problems in case of operation errors. The solution to this technical problem is provided in the claims.

According to the present invention, the exemplary stair-climbing device comprises a detection unit for detecting the current position of the support unit with respect to one or several steps of the stair, wherein the detection unit comprises at least one non-contact sensor. The detection unit provides signals to the control unit which contain information concerning the current position of the support unit with respect to one or more steps of the stair. The control unit is designed as such that operation of the climbing unit is controlled depending on signals of the detection unit.

For instance, the control unit can be designed such that as a function of signals of the detecting unit initiating or continuing the climbing operation is prevented and/or the climbing operation is interrupted. In this connection, initiating or continuing the climbing operation can be prevented and/or the climbing operation can be interrupted if by means of the detecting unit an improper position of the support unit with respect to the stair is detected, and initiating or continuing the climbing operation is allowed if by means of the detecting unit a proper position of the climbing unit is detected.

The control unit can be further designed such that depending on signals of the detecting unit a drive direction (direction of movement) for the climbing operation is detected and/or initiating of the climbing operation is automatically activated. It can further detect whether the stair-climbing device has been moved to the front end of the step so that the direction of movement is detected as downstairs. As an example, in this case, upon activating a drive signal by an operator due to operation of a corresponding button of an operation unit, it can automatically select the direction of movement downstairs and control operation of the climbing unit accordingly.

In the same manner, the stair-climbing device can detect whether it has been moved to the rear end of the step so that the direction of movement is detected as upstairs. In this case, upon activation of a drive signal by the operator due to operation of a respective button of an operation unit, it can automatically select the direction of movement upstairs and control operation of the climbing unit correspondingly.

In a corresponding embodiment, the selection of direction of the climbing operation can be maintained in both cases and can only be checked again or determined, respectively, upon reaching a neutral position.

In a corresponding embodiment, the control unit can be designed such that initiating the climbing operation can be automatically activated as a function of signals of the detecting unit. If it detects that the stair-climbing device has been moved to the front end of a step, so that the direction of movement is detected as downstairs, it can automatically initiate the climbing operation in a direction downstairs and control operation of the climbing unit correspondingly.

In the same manner, the stair-climbing device can automatically activate initiation of the climbing operation upstairs as a function of signals of the detecting unit. If it detects that the stair-climbing device has been moved to the rear end of a step, so that the direction of movement is detected as upstairs, it can automatically initiate the climbing operation in the direction upstairs and control operation of the climbing unit correspondingly.

It is understood that such kind of operation of a stair-climbing device is preferably effected in combination with further safety inquiries, for instance concerning exact and correct positioning of the stair-climbing device.

It is further understood that such automatic initiation of the climbing operation is preferably effected as a feature which can be separately selected or additionally activated and which can be activated or deactivated by a user depending on the local circumstances or in accordance with the desire of the operator.

The control unit also can be designed such that the operating speed of the climbing unit is controlled as a function of signals of the detecting unit. For instance, the operating speed of the climbing unit can be reduced if a position of the support unit with respect to the stair is detected which is not perfectly secure, so that an operator is provided with more time to optimize the position or respond to corresponding effects.

Furthermore, the control unit can be designed such that the direction of operation of the climbing unit is reversed as a function of signals of the detecting unit. This can also serve to facilitate correction by an operator or, as the case may be, to avert danger.

Due to provision of one or more non-contact sensors at the support unit itself, the position thereof with respect to the steps of the staircases prior to and during the climbing operation can be continuously detected, specifically also in such positions in which the support unit is not in contact with the stair. This allows corresponding options concerning design of the climbing elements.

The stair-climbing device according to the present invention takes into account the security problems associating with non-continuously, but cyclically operating climbing elements in that the climbing operation can be interrupted or the initiation or continuation of the climbing operation can be prevented, respectively, if the support unit has an improper position with respect to the stair. This makes it possible to correct the position of the stair-climbing device during the climbing operation which, for instance, can become necessary in narrow winding stairs, avoiding that upon improper correction and respective improper position during the climbing operation a danger of fall. Furthermore, the additional possible options of intervention of the control unit take account thereof.

In principle, there is the option to use only one non-contact sensor. Preferably, this can be such a non-contact sensor which can sense in a plurality of directions.

In a preferred embodiment of the invention, the detection unit can comprise at least three, preferably four non-contact sensors. These preferably can be disposed in a central portion of the support unit. Due to an advantageous logic interconnection of the signals of the non-contact sensors it can be achieved that unwanted skewed positioning of the support unit with respect to the edge of the step can be detected although sensors are only disposed in the centre. This avoids the necessity of providing two sensors, respectively, in the lateral direction, for instance in the area of the outer edges of the support unit.

Preferably, a first non-contact sensor, the direction of detection of which extends vertically down, is provided in a front portion of the support unit. This first non-contact sensor serves specifically to ensure proper position of the support unit with respect to the front edge of the step. This relates not only to the distance to the front edge of the step, but also to the skew angle, wherein skewed means the angle with respect to the edge of the step, namely an angle in the horizontal plane, while an angle in a vertical plane in this connection is designated as inclination angle.

The second non-contact sensor is preferably disposed at the bottom side of the support unit. Its direction of detection extends horizontally.

The terms "front", "back" or "rear", "top" and "bottom" in the present application relate to an operating position of the stair-climbing device on a stair. "Front" means the direction downstairs, while "rear" or "back" means a direction upstairs. Also terms such as "top", "down" or "bottom", "horizontal" and "vertical" are based on an operating position of the stair-climbing device on a stair. It is understood that this includes a certain range of angles since the stair-climbing device does not remain constant during operation on a stair with respect to its inclination angle.

The second non-contact sensor detecting in a horizontal direction can detect the distance to the riser of the step, that is the vertical portion between each tread on the stair. If during the climbing operation there is a change by leaps and bounds, in case of corresponding logic interconnection it can determined thereupon that the support unit has reached a height which is above the tread of the next higher step.

A third non-contact sensor can be disposed in a rear portion of the support unit and has a direction of detection which extends vertically down. By means of this third non-contact sensor it can be particularly detected whether the support unit, upon initiating of a climbing operation in a direction upstairs, is sufficiently close to the next higher step.

A fourth non-contact sensor also having a direction of detection extending vertically down can also be provided in a rear portion of the support unit, however preferably below and in front of the third non-contact sensor. This fourth non-contact sensor can, specifically if two climbing elements disposed on both sides effect the climbing operation in a parallel movement, avoid that due to a skewed position of the support unit with respect to the edge of the step only one of the climbing elements would get in contact with the next higher step. In this case, the climbing operation, that means the movement of the climbing elements, would be interrupted according to the present invention so that a correction could be effected by an operator.

The climbing device according to the present invention also can comprise an inclination angle sensor and further sensors which contribute in corresponding logic interconnection to a precise detection of the position of the support unit with respect to the stairs and ensure safe operation of the stair-climbing device.

BRIEF DESCRIPTION OF THE DRAWINGS

In the following, an embodiment of a stair-climbing device designed according to the present invention and intended for a wheelchair is explained in connection with the drawings.

FIG. 5 to 8 show the wheelchair in four different positions of a stair-climbing device during climbing of a stair, wherein FIG. 7 shows the usual drive and storage position of the climbing wheels or pair of running wheels, respectively;

FIG. 9 is a partial sectional view of one of the running wheels of a pair of running wheels according to FIG. 3;

DETAILED DESCRIPTION OF THE INVENTION

Figure 1:
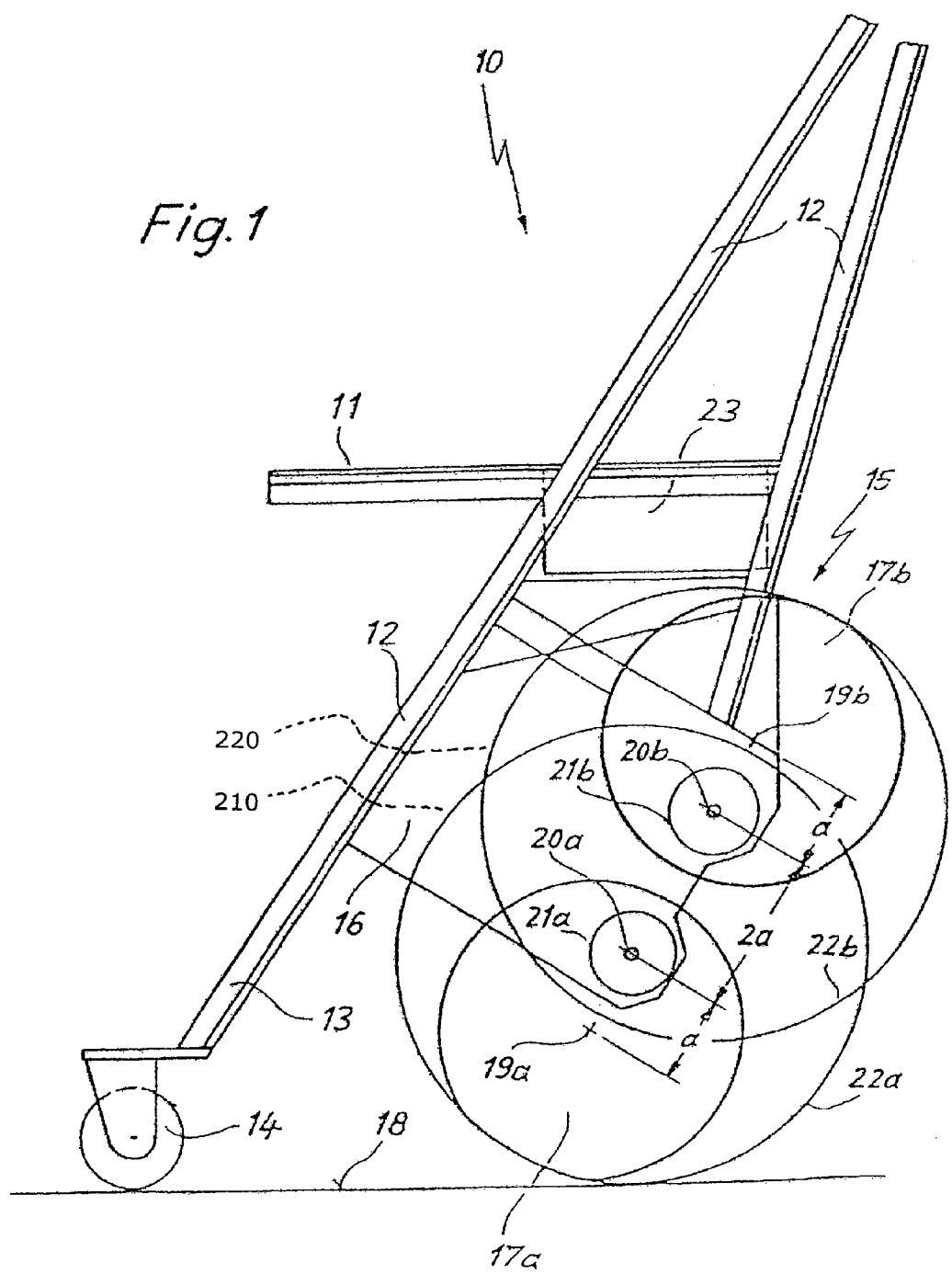
FIG. 1 is a schematic partial side elevation of a wheelchair with a pair of running wheels of a stair-climbing device.

FIG. 1 is a schematic side view of an invalid's' wheelchair 10 comprising a seat frame 11 which is connected to a chair frame 12, which at the front runs out into two foot webs 13 which have each one steering roller 14 rotatably mounted. The side view of FIG. 1 only shows the left steering roller 14. Attached to chair frame 12 is a support frame for a stair-climbing device 15, comprising a left support plate 16, as shown in FIG. 1, and an identical right support plate 16 on the right side, which is not shown, of chair 10. To each support plate 16 is fitted a pair of running wheels 17a and 17b, one of which runs on track 18 in the normal position or in the inoperative position of stair-climbing device 15 shown in FIG. 1 and FIG. 4. The exact construction of the pair of running wheels 17a/17b and the arrangement of the two running wheels 17a and 17b relative to one another and their drive will be described below in more detail as based on FIGS. 2 and 3. FIG. 1 shows the centre points 19a and 19b of the two running wheels 17a and 17b as well as driveshafts 20a and 20b with associated drive-sprocket wheels 21a and 21b, which driveshafts are arranged eccentrically thereto and mounted in support plate 16. Furthermore, the surrounding circles 22a and 22b illustrate the periphery of the running wheels 17a and 17b during their movement around the eccentric driveshafts 20a and 20b. The distance between the two driveshafts 20a and 20b is 2a, i.e. double the distance value a of centre point 19a or 19b of running wheel 17a or 17b from the axis of its eccentric driveshaft 20a or 20b.

Figure 2:
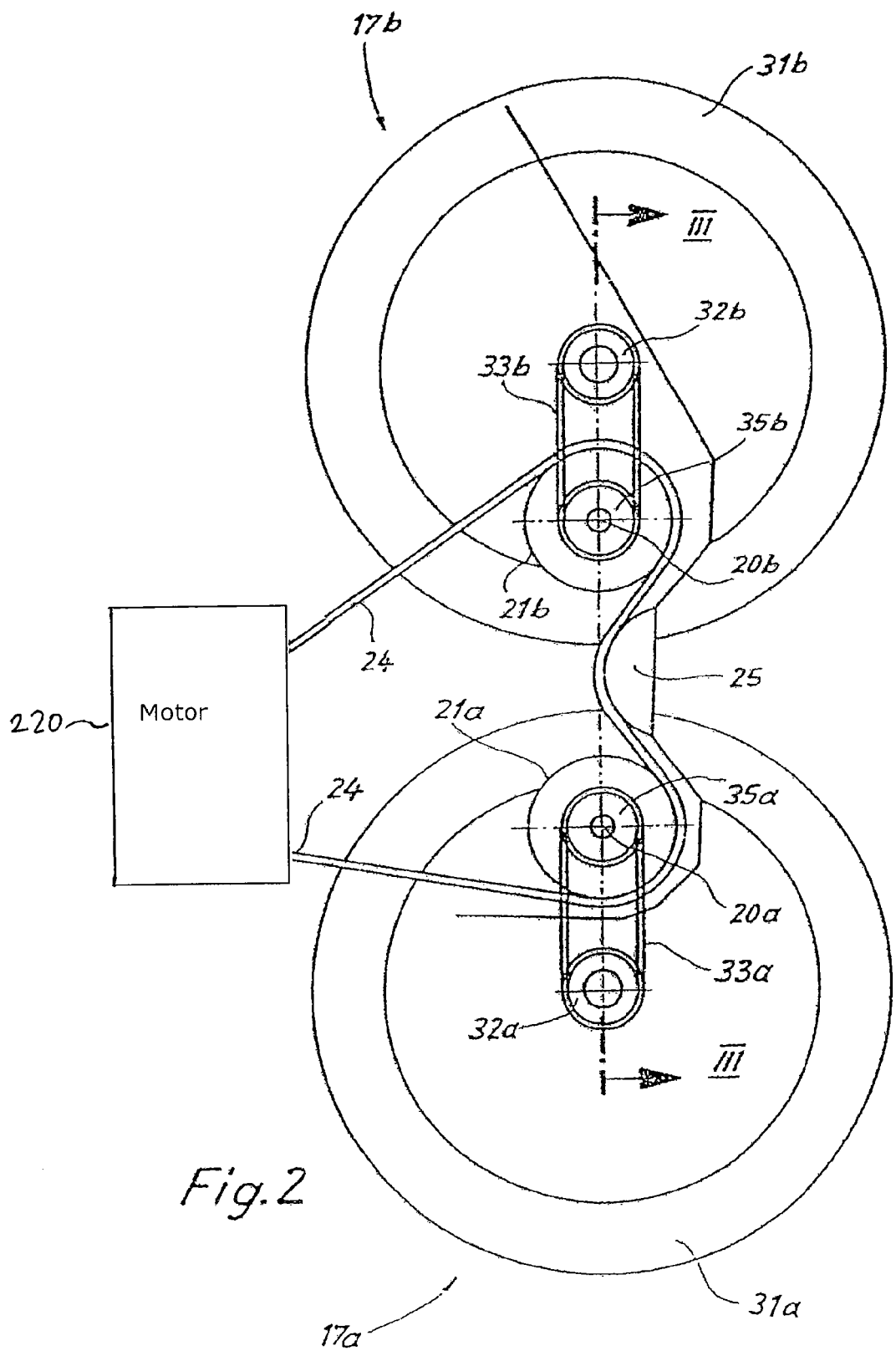
FIG. 2 is a schematic side elevation of the pair of running wheels with the drive device.

An electric drive motor 220 operates the stair-climbing device and is of a well-known type. FIG. 1 shows a box 23 underneath seat frame 11 for accommodating accumulators which power electric drive motor 220, which is connected to an electric control unit 210. The motor 220 moves a continuous chain 24, as shown in FIG. 2, which is guided via the two sprocket wheels 21a and 21b of the two driveshafts 20a and 20b so as to produce a rotary movement of respective same direction and speed of the two driveshafts 20a, 20b. Between the two sprocket wheels 21a and 21b, the common drive chain 24 is guided via a sliding member 25, which can be substituted by a chain-diverting wheel. It is understood that an identical pair of running wheels is arranged and driven in exactly the same manner at the right side of wheelchair 10.

Figure 3:
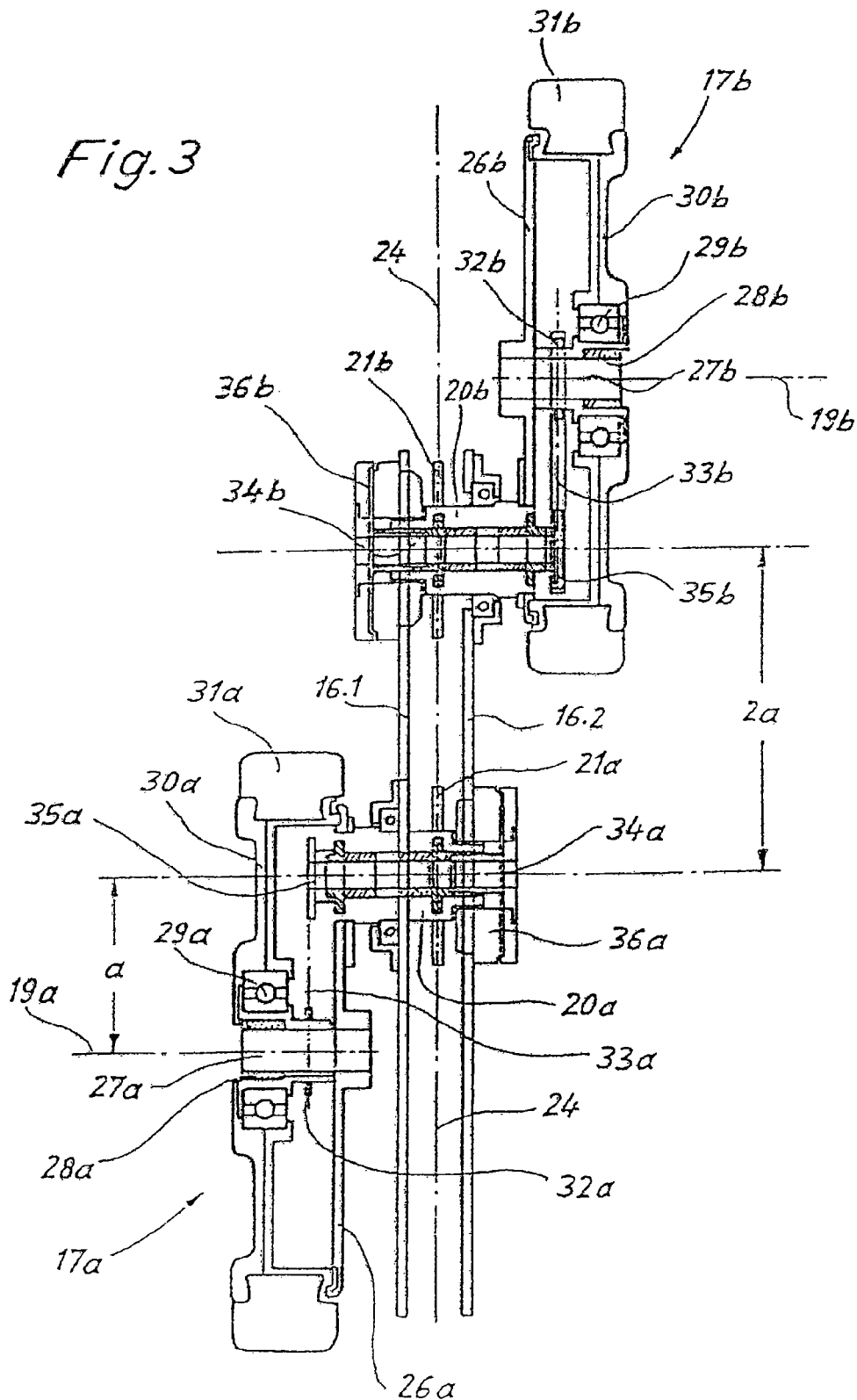
FIG. 3 is a sectional view which is enlarged as compared with FIG. 2 along line III-III in FIG. 2 through the pair of running wheels.

The cross-sectional illustration of FIG. 3 shows that support plate 16 consists of two carrier walls 16.1 and 16.2, which are a distance apart and parallel relative to one another, with a common drive chain 24, which is indicated by broken lines, in-between, and that there are sprocket wheels 21a and 21b mounted onto driveshafts 20a and 20b, which are hollow shafts mounted in support plate 16.1/16.2.

The cross-sectional illustration of FIG. 3 further shows the arrangement of the running wheels and a brake device acting on the running wheels. Each of the two identical running wheels 17a and 17b of a pair of running wheels comprises a hub disc 26a, 26b which is firmly connected to the eccentric driveshaft 20a, 20b and comprises a centric axis pin 27a, 27b. Onto axis pins 27a, 27b is pushed a bearing sleeve 28a, 28b with a roller-bearing directional lock 29a, 29b attached, onto which is mounted a running rim 30a, 30b, which terminates in a rubber tire 31a, 31b. Bearing sleeve 28a, 28b is provided with a sprocket wheel 32a, 32b which is coupled, via a continuous chain 33a, 33b shown in FIG. 2, to sprocket wheel 35a, 35b, which is mounted coaxially to the associated hollow driveshaft 20a, 20b onto a shaft journal 34a, 34b, which is mounted concentrically in the driveshaft. Shaft journal 34a, 34b is connected to the brake disc of an electro-magnetically operated brake device 36a, 36b, which connection is not illustrated in detail.

The two sprocket wheels 32a, 32b and 35a, 35b are of equal size, resulting a chain drive at a gear ratio of 1:1. If the electro-magnetic brake device 36a, 36b is activated via a control device (not illustrated), then shaft journal 34a, 34b is blocked, and so is bearing sleeve 28a, 28b, so that roller-bearing directional lock 29a, 29b permits rotation of running rim 30a, 30b of the respective running wheel 17a, 17b in only one direction. In the other direction of rotation, the respective running wheel 17a, 17b is blocked. However, by driving chain 24 and thus causing rotation of driveshafts 20a, 20b, the hub disc 26a, 26b, which is rigidly fixed to driveshaft 20a, 20b, and running rim 30a, 30b of running wheels 17a and 17b are pivoted to perform the stair-climbing movement upwards or downwards, depending on the set direction of rotation of the drive motor 220 for chain 24. During the lift movement of a running wheel, its running rim remains braked and stationary due to the chosen gear ratio of 1:1 of the chain drive.

FIGS. 2 and 3 show the manner in which hub disc 26b of the one running wheel 17b of the pair of running wheels 17a/17b is connected to its associated driveshaft 20b as transposed relative to hub disc 26a of the other running wheel 17a through a peripheral angle of 180°.

Figure 4:
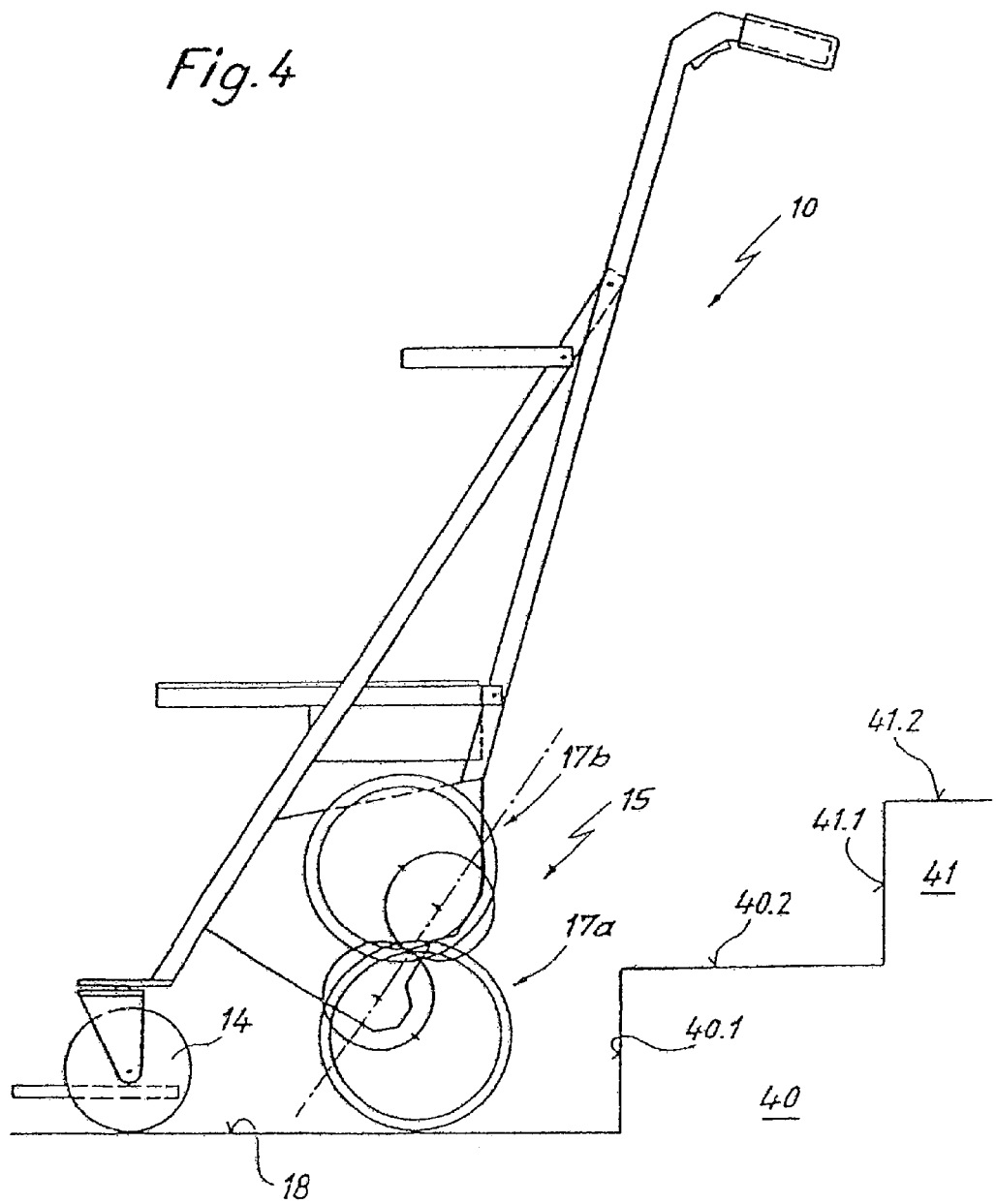
FIG. 4 is schematic side elevation of the wheelchair.
Figure 5:
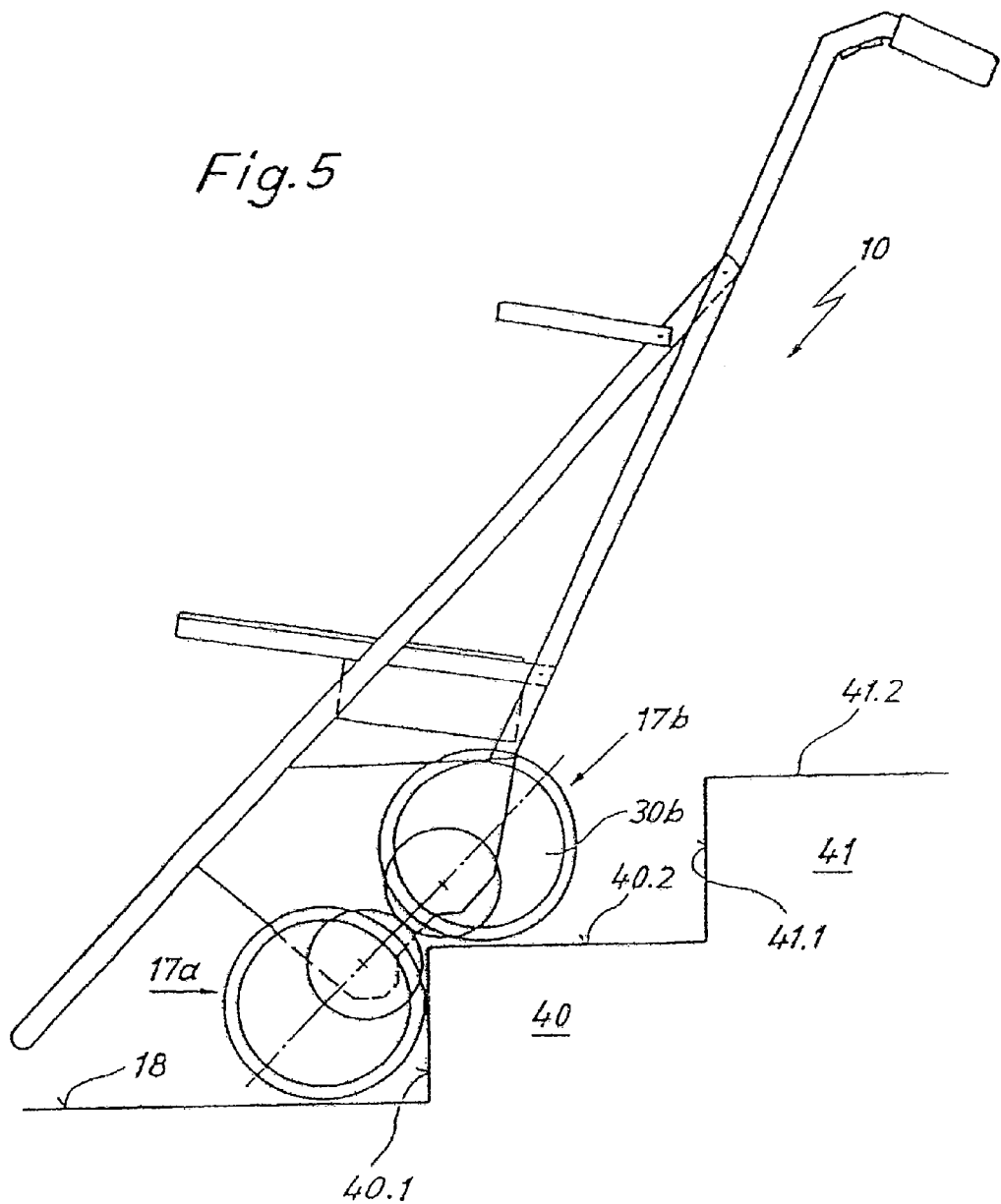
Figure 6:
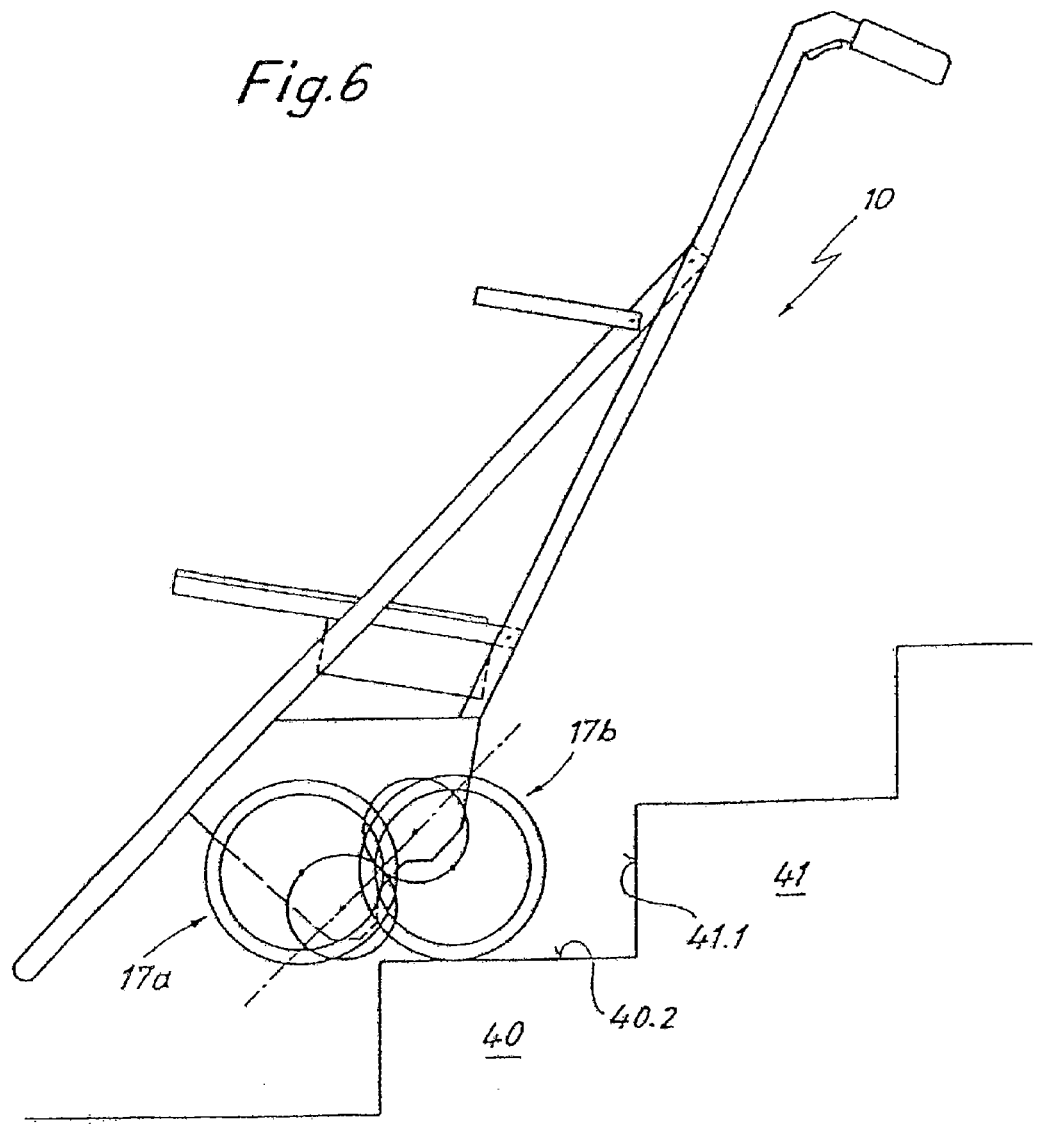
Figure 7:
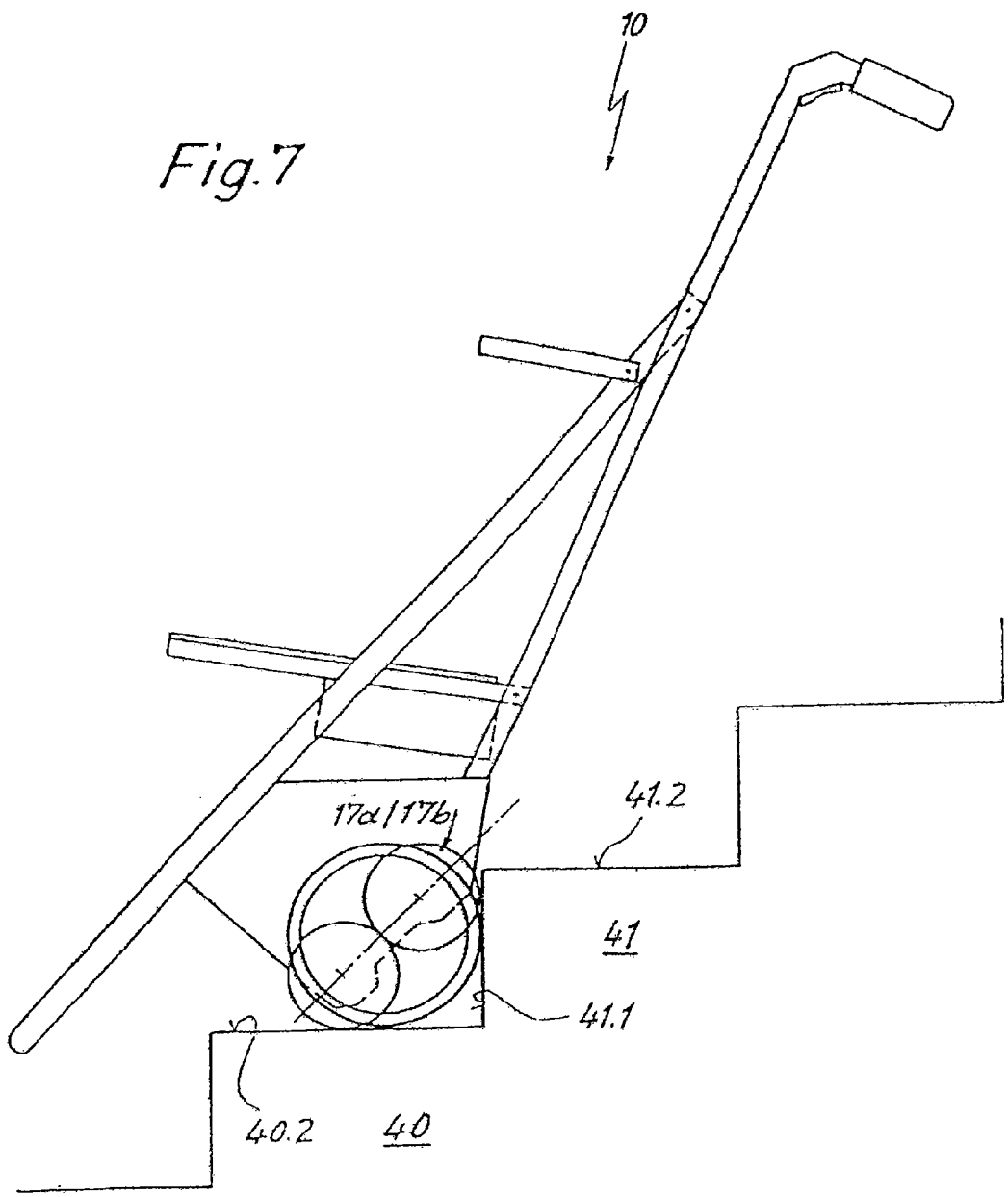
Figure 8:
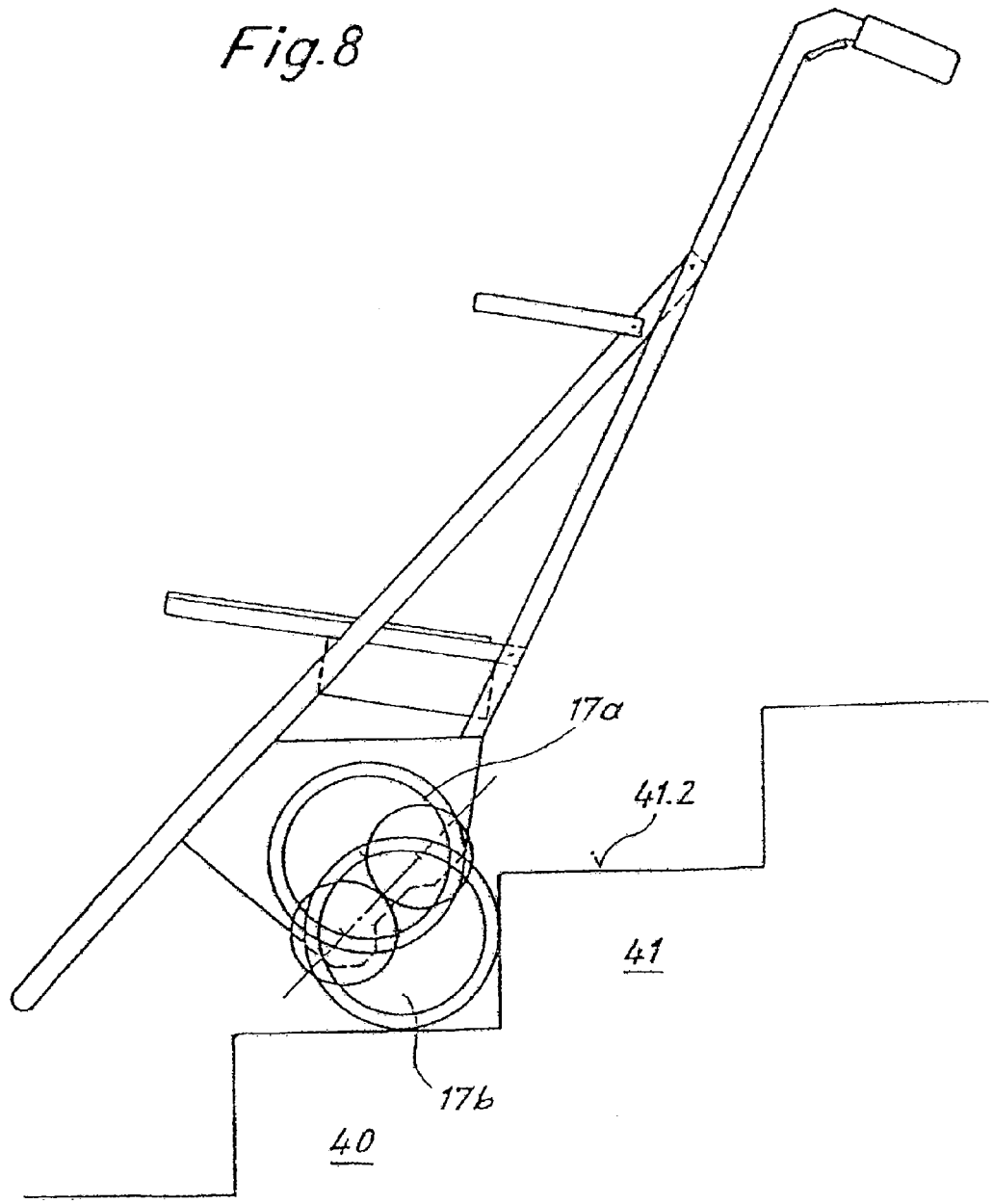

FIG. 4 to 8 demonstrate the movement path of the pairs of running wheels of the stair-climbing device during the ascend. The figures show wheelchair 10 in a respective side view, consequently only one of the two pairs of running wheels of the stair-climbing device 15 is shown. FIG. 4 shows wheelchair 10 in a normal drive position with both running wheels 17a and 17b of both pairs of running wheels arranged approximately on top of one another and running wheel 17a placed on track surface 18. In this position, wheelchair 10 with idle chain 24 and without brakes applied can move freely. In this normal operating position, wheelchair 10 is driven backwards against the front edge 40.1 of the first step 40, the brakes are applied, and the drive motor 220 for chain 24 of the stair-climbing device 15 is switched on. This causes running wheel 17b with its running rim 30b, which is blocked in the forward direction, to be moved onto the top surface of the first step 40, as shown in FIG. 5. Wheelchair 10 is now supported by running wheel 17b, whilst in continuance of the operation of the stair-climbing device running wheel 17a is pivoted upwards, as shown in FIG. 6. Due to the roller-bearing directional lock 29a, the wheelchair can roll on running wheels 17b up to front edge 41.1 of the next step 41. In continuance of the movement of the stair-climbing device, the two running wheels 17a, 17b of the two pairs of running wheels arrive at a coaxial position, as shown in FIG. 7, from which running wheel 17a is pivoted upwards as in FIG. 8 until it arrives on the stepping surface 41.2 of the second step 41 in a position analog to that in FIG. 5. This process is repeated, whereby running wheel 17b is always lifted onto the next step; running wheel 17a is lifted afterwards.

FIG. 9 shows a central longitudinal section of a running wheel 17b' of a stair-climbing device with the electro-magnetic brake device arranged at hub disc 26b'. This produces a larger braking surface. An anchor plate 42, which is connected to running rim 30b', is spring-loaded into the braking position, in which thereto attached locking pins 43 engage a perforated ring 46, which is attached to running rim 30b', causing the brake device to be automatically activated in the event of power failure. The brake is released by exciting the magnet winding 44, which is arranged on a counter plate 45 which is rigidly attached to bearing sleeve 28b'. A roller-bearing directional lock 29b' is then arranged on shaft journal 34b'.

In the embodiment according to FIG. 10 to 15, a mechanical brake device in the form of a knee-lever brake is provided wherein a lever pivotably supported below the centre axis of the running wheel is pushed via a spring element against the track. A probing wheel 120 is arranged at the outer end of the lever such that upon moving forward the stair-climbing device in order to descend it to the next lower step, it is arranged in the direction of movement in front of the centre axis of the running wheel. The lever has a laterally attached brake shoe which is adapted to get in engagement with the running wheel, wherein it preferably engages in a radial undercut of the running wheel. When, in order to descend the stair-climbing device on the next lower step, it is moved in direction of the edge of the stair, the lever lowers as soon as the probing wheel 120 has gone beyond the step and, due to the knee-lever like function, the wheel is braked or blocked, respectively. The arrangement is designed such that the brake forces become higher the more the force in forward direction is increased. Thereby, slipping through the brake is reliably prevented.

In the embodiments described above and shown in the figures, the support unit is realized by the seat frame 11 and the chair frame 12. It is understood that the principle according to the present invention can be applied to any other stair-climbing device. For instance, stair-climbing devices can be provided which can be connected to an existing, commercially available wheelchair.

The principle according to the present invention can also be applied to any other stair-climbing devices which together with or without an external operator are adapted to transport freight or persons on stairs.

FIG. 10 to 15 show an embodiment of a stair-climbing device which substantially corresponds to the climbing unit described in connection with the embodiments shown in FIG. 1 to 9 and wherein the support unit is realized by a body 100 which functionally corresponds to the support unit of the embodiment according to FIG. 1 to 9 formed by the seat frame 11 and the chair frame 12. The body 100 comprises at its front side a plurality of bores 101 which serve, in connection with corresponding connecting elements (not shown) to attach a wheelchair (not shown) to the body 100. Handle tubes 110, which in the figures are only depicted schematically as tube segments, connect the body 100 with a handle and operating unit which also is not depicted in the figures. The depiction in the figures is partly only sketchy and schematically and not in unity as far as a scale is concerned.

Figure 10A:
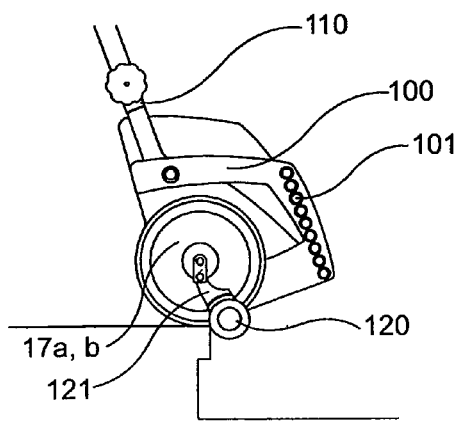
FIGS. 10a to 10c show a schematic depiction of the climbing operation downstairs.
Figure 10B:
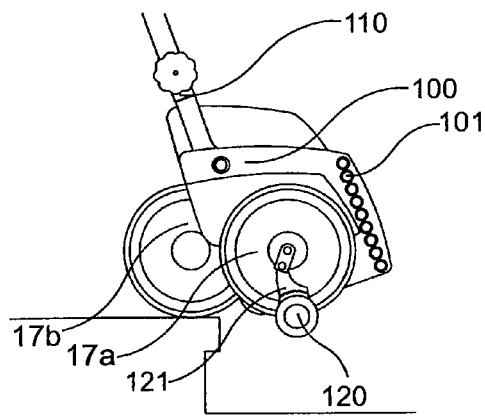
Figure 10C:
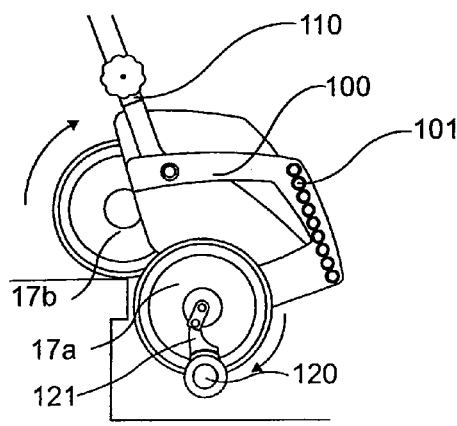

FIGS. 10a to 10c schematically show the climbing operation downstairs. The stair-climbing device is moved to the edge of the step. As soon as the probing wheels 120 which are supported at pivotable levers 121, go beyond the edge of the step, a brake function of the running wheels 17 is activated by pivoting of the levers 121. In the depiction according to FIG. 10a, the outer running wheels 17a and the inner running wheels 17b are in coaxial position with respect to each other (neutral position). From FIGS. 10b and 10c it can be taken how by pivoting the outer running wheels 17a and the inner running wheels 17b the body 100 is lowered to the next lower step of the stair.

Figure 11A:
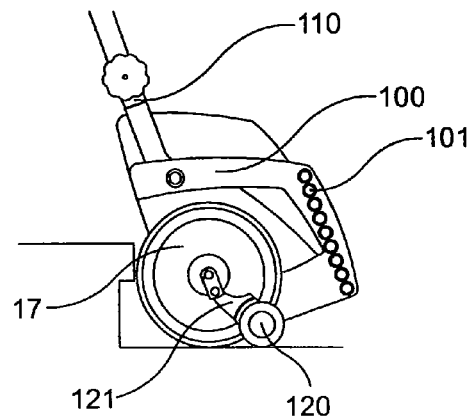
FIGS. 11a to 11c show a schematic depiction of the climbing operation upstairs.
Figure 11B:
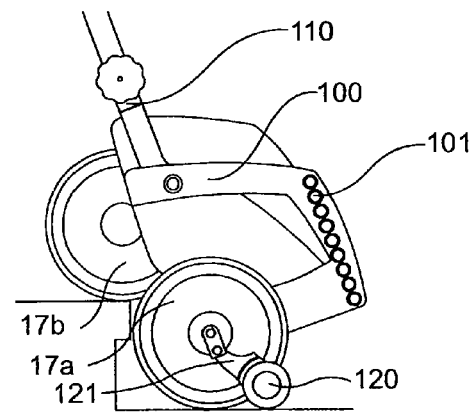
Figure 11C:
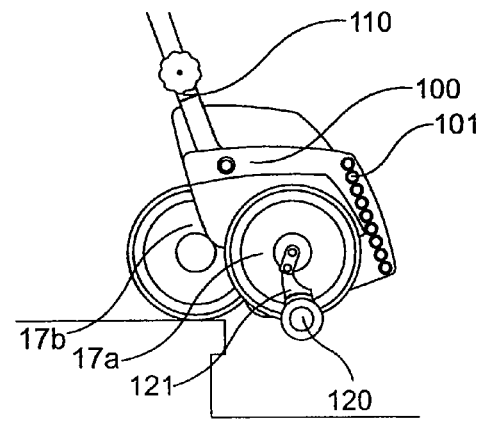

FIGS. 11a to 11c show in a corresponding schematic and simplified depiction the climbing operation upstairs. In order to achieve this, the stair-climbing device is moved to the edge of the next higher step, by means of pivoting the running wheels, the inner running wheels 17b get in contact with the upper surface of the next higher step, whereby, at the same time, the body 100 is already lifted (see FIG. 11b) and finally, through the further intermediate position as shown in FIG. 11c, reaches the so-called neutral position, as shown in FIG. 10a.

It is understood that the operating person inclines via the grip unit, which is not shown, and the support tubes 110 the stair-climbing device and the wheelchair attached thereto (not shown) in an appropriate inclined position.

The terms inclination and inclination angle herein determine the angular relation perpendicular to the track surface, for instance the top surface of the step, which is considered to be horizontal, while the terms skew, skewed or in a skewed position relate to the positioning with respect to the edge of a step, i.e. the angular position within a horizontal plane.

Figure 12A:
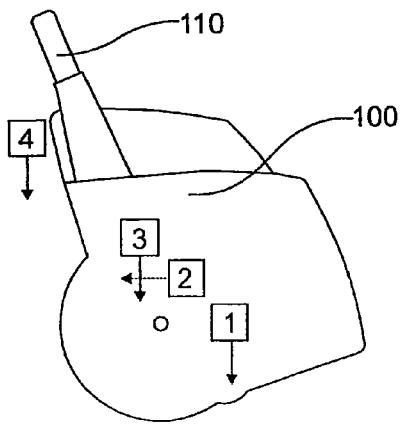
FIGS. 12a to 12c show schematic views of a stair-climbing device from the side, from behind and from the top in order to show the arrangement of four non-contact sensors as a matter of principle.
Figure 12B:
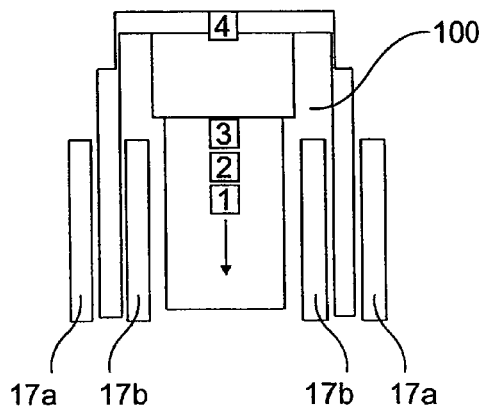
Figure 12C:
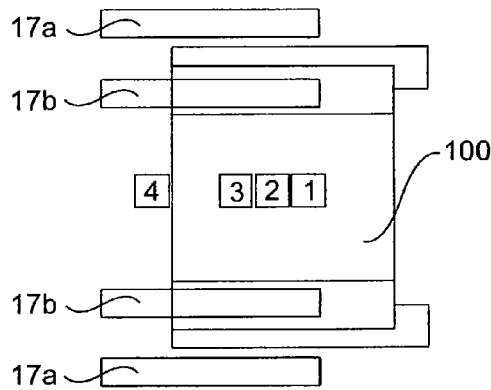

FIG. 12a is a schematic side view of the body 100 in which by square boxes positions are indicated in which the four non-contact sensors 1, 2, 3 and 4 are installed. The arrows in the respective boxes show additionally, in which direction the scanning function of the sensors is effected. In a corresponding manner, FIG. 12b shows a rear view of the body 100 and FIG. 12c shows a view of the body 100 from the top, also in schematic depictions, respectively. Non-contact sensors 1, 2, 3 and 4, as well as other sensors described below, are part of detection unit 200 (see FIG. 18). The detection unit 200 provides signals 230 to the control unit 210 which contain information concerning the current position of the support unit with respect to one or more steps of the stair.

From these views it can be taken that the sensor 1 is attached relatively far down and at the front side of the body 100, wherein its direction of the scanning extends downwards, the sensor 2 scans in a rearward direction and the sensors 3 and 4 also scan downwards, wherein sensor 3 is placed more to the front and further down than sensor 4 which is placed in the upper part of the rear side of the body 100. As can be taken particularly from FIG. 12b, the non-contact sensors 1, 2, 3 and 4 are attached in the centre part of the body 100. Non-contact sensors may be infrared sensors, for example.

Figure 13:
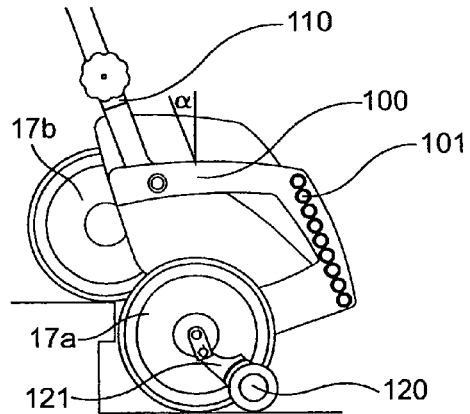
FIG. 13 is a schematic depiction of the mode of operation of an inclination angle sensor.

FIG. 13 shows, that an inclination angle α is detected with respect to the vertical by an inclination angle sensor 5 disposed within body 100.

Figure 14:
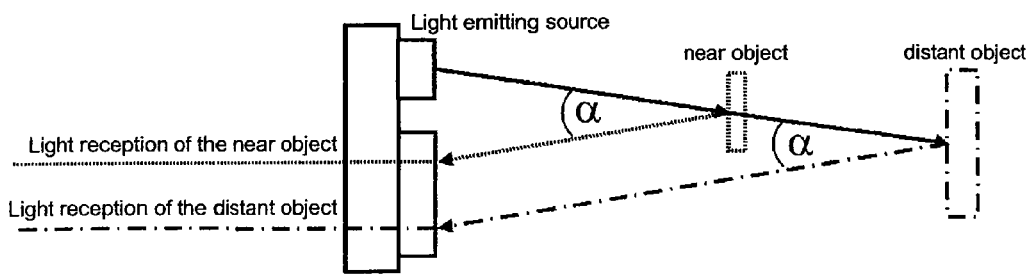
FIG. 14 is a schematic depiction of the mode of operation of a non-contact distance sensor according to the principle of triangulation.

The basic principle of function of a non-contact optical sensor is shown in FIG. 14. FIG. 14 shows that the distance to an object from the sensor can be detected via the position at which reflected light which is emitted from a light emitting source is received on the light receiving surface of the sensor.

In the following, the functions in connection with the scanning of the sensors as well as the further means of the stair-climbing device, particularly the probing wheels 120 and the inclination angle sensor 5, the corresponding control unit 210 and the respective driving or moving situations are explained.

Figure 18:
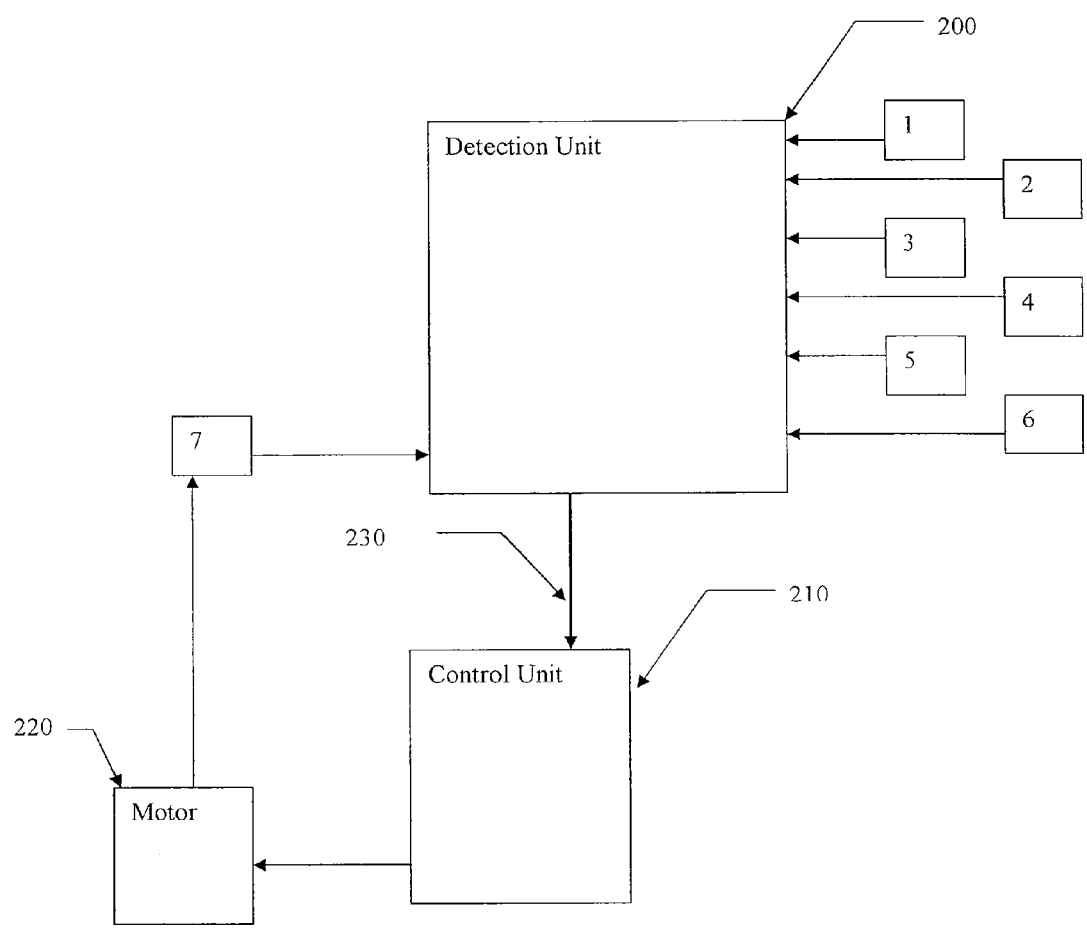
FIG. 18 is a block diagram illustrating the control and sensing system.

In addition to the sensors mentioned above, a further position determination sensor 6 disposed within body 100 for detecting a specific position of the climbing element, specifically the running wheels 17a and 17b, which can be designed as a HALL-sensor and used typically for determining the neutral position, as well as a count sensor 7 for counting revolutions of the drive motor 220, which also can be designed as a HALL-sensor and is particularly used for determining the current climbing position and the direction of movement can be provided. The inclination angle sensor 5 for determining the support angle α (see FIG. 13) can be designed as an acceleration sensor which measures the deviation in gravitational acceleration. A block diagram illustrating the interconnection between the various sensors and controllers is shown in FIG. 18.

Prior to the start of a climbing operation downwards, the running wheels 17a, 17b are brought into the so-called neutral position, that means the position, in which all four wheels are parallel to each other. Then, the stair-climbing device together with an attached wheelchair (not shown) is tilted backwards in a stable balance by an operating person and moved in a forward direction to the stairs, up to a position where the probing wheels 120, which can be designed as mechanical probing wheels, reach the edge of the step, extend beyond this edge and thereby exert a braking effect on the running wheels 17a, 17b. Subsequently, a direction of movement downwards is selected by means of a drive direction switch (not shown) and the climbing operation is initiated by means of a drive switch (not shown). Due to this, the outer pair of running wheels 17a start to move away from the edge of the step, while the inner running wheels 17b remain at the edge of the step due to the brake force. At the same time, the body 100 with the wheelchair attached thereto (not shown) is lowered in the direction of the next lower step.

The climbing operation can be interrupted at any time by releasing the drive switch, so that all wheels immediately stand still.

The person operating the stair-climbing device has to keep the entire system consisting of the stair-climbing device, the wheelchair and the person sitting in the wheelchair permanently in balance. In an emergency situation, the entire system can be put down to the rear side of the steps of the stair which would not lead to a dangerous situation since, as explained above, the running wheels are fixed in this position due to the brake force.

A dangerous situation, however, also could be caused under circumstances due to the fact that the climbing operation downwards is initiated in a position in which the body 100 is in a skewed position with respect to the edge of the step, for instance in a situation, where one of the running wheels is pushed forward to an extend where its respective probing wheel 120 already generates a brake force while the other pair of running wheels is not advanced in the same way. Such skewed position can be detected by the non-contact sensor 1. It provides a relative measuring result concerning the distance to the step surface which in the form of specific data information is provided to the control unit. In connection with signals of the inclination angle sensor 5 as well as the brake function of the probing wheel 120 it can be ensured that a position appropriate for a climbing operation downwards is detected. In this case, the climbing operation can be initiated.

If such position is not detected, since the position with respect to the edge of the step is too skewed, the control unit prevents upon receipt of corresponding signals of the respective sensors that the climbing operation is initiated. In this case, just as in other dangerous situations too, respective optical, audible and other warning signals are emitted.

In case of a climbing operation upstairs, the stair-climbing device also is at first put into a position in which the running wheels 17a, 17b are in a neutral position. In this position, the stair-climbing device is pulled fully backwards to the next step. After preselection of the direction of movement upstairs and operation of the drive switch, the inner pair of running wheels 17b starts to move in the direction to the next higher step. At the same time, the body 100 and the wheelchair attached thereto (not shown) is lifted. When the inner running wheels 17b touch the next higher step, the load is shifted from outer running wheels 17a on the lower step to the inner running wheels 17b on the upper step. The operation person has to take account of the load change. Just as in case of the climbing operation downstairs, the climbing operation upstairs can be interrupted at any time by releasing the drive switch (not shown). As far as all four running wheels 17a, 17b are again parallel to each other on the step of the stair, the climbing cycle is completed.

The danger in connection with the climbing operation upstairs is particularly given in fact the climbing operation is initiated if the stair-climbing device is not sufficiently close to the edge of the step. This can have the result that the inner running wheels 17b touch the top surface of the upper step only with a small overlap which can lead to slipping off. The further danger is that the climbing operation is effected in a position too skewed with the upper edge of the stair, which can have the result that only one of the two inner running wheels 17b would touch down on the upper step of the stair.

In this connection, specifically the non-contact sensor 4 ensures that a sufficiently small distance between the body 100 and the next higher step of the stair is ensured. Since upon pulling back the stair-climbing device there is a natural limit stop, also a corresponding skewed position can be detected by means of the non-contact sensor 4 placed in the centre.

Furthermore, the height of the step can be permanently detected by means of the non-contact sensor 2 during the climbing operation as a function of the angle α and can be matched with the measuring result of the non-contact sensor 4. Hereby, particularly the point of time can be determined at which the non-contact sensor 2 is lifted above the edge of the step, since in this case there is a discontinuity concerning the measuring results. This can be used to determine the exact height of the step which can be used for further functions of the stair-climbing device and allows exact determination of the geometry of the steps of the stair.

Also the non-contact sensor 3 which is placed further in front and further down and the measuring results determined by it are included in the safety function during the climbing operation upstairs. While the non-contact sensor 4 is of importance particularly at the beginning of the climbing operation, because it determines in the lowest position of the body 100 presence of the upper edge of the step, the signals of the non-contact sensor 3 which is arranged more in front and further down is of particular importance upon touchdown of the inner running wheels 17b, since it is closer to the respective top surface of the step in this stage of the climbing operation.

Figure 15A:
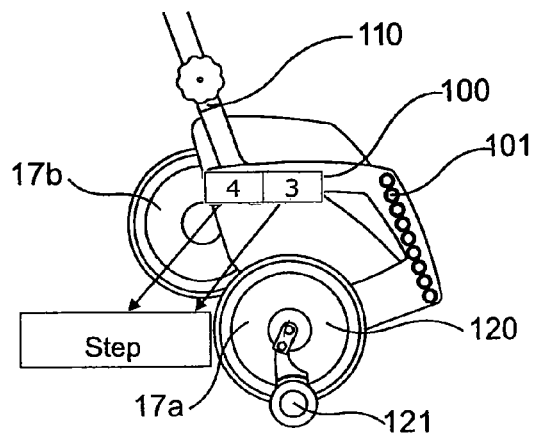
FIGS. 15a to 15c are depictions for explanation in connection with an idle lift.
Figure 15B:
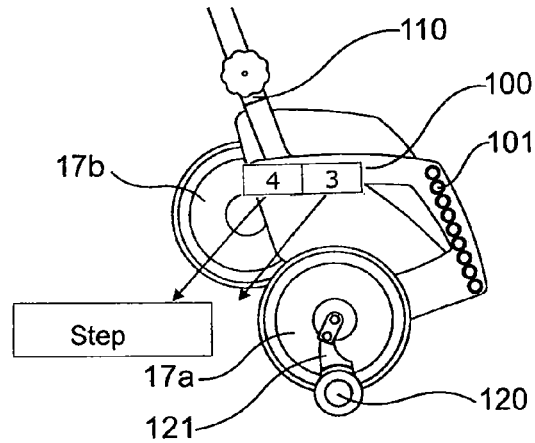
Figure 15C:
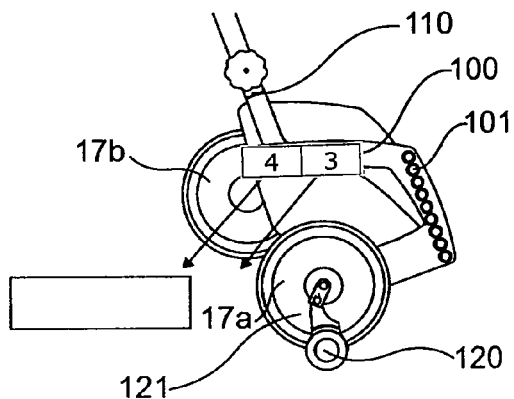

The co-action of the non-contact sensor 3 and 4 is also of importance for the constellation in connection with the so-called idle lift which is shown in FIGS. 15a to 15c.

FIG. 15a shows a situation upon climbing upstairs short before touchdown of the inner running wheels 17b on the next higher step. In the position shown in FIG. 15a, non-contact sensor 4 as well as non-contact sensor 3 which is placed more in front detect the upper step. This ensures that the inner running wheels 17b can touch down on the upper step in an appropriate manner.

In the position according to FIG. 15b, non-contact sensor 4 disposed more in the back still detects the surface of the next higher step, while non-contact sensor 3 which is arranged more in front does not. This is detected as a condition in which the overlap between the inner running wheels 17b and the top surface of the step is not sufficient. In this case, the climbing operation would be interrupted. Only if the stair-climbing device is pushed closer to the edge of the step, so that a position according to FIG. 15a would be reached, the climbing operation could be continued.

In the position shown in FIG. 15c, non-contact sensor 3 also would not detect the top surface of a step and therefore, in principle, would prevent continuation of the climbing operation in accordance with corresponding control actions of the control unit. However, such idle lift can be desired, particularly in connection with the docking of a stair-climbing device to a wheelchair. In order to achieve this, the stair-climbing device can be lifted to a desired height since, as explained in detail above, already upon pivoting of the inner running wheels 17b a simultaneous lifting of the body 100 is effected. However, in order to effect a climbing operation it is at first necessary that the neutral position is obtained again, i.e. the inner running wheels 17b have to be moved further on their circular part until they reach a parallel position with respect to the outer running wheels 17a.

In order to achieve this, the signal of the non-contact sensor 4 is checked in addition to the signals of the non-contact sensor 3. If both non-contact sensors do not detect the top surface of a step, the control unit follows therefrom that there is no top surface of a step in a vicinity so that there is no danger of touchdown with a non-sufficient overlap or a touchdown only on one side, so that the idle lift can be completed.

Figure 16:
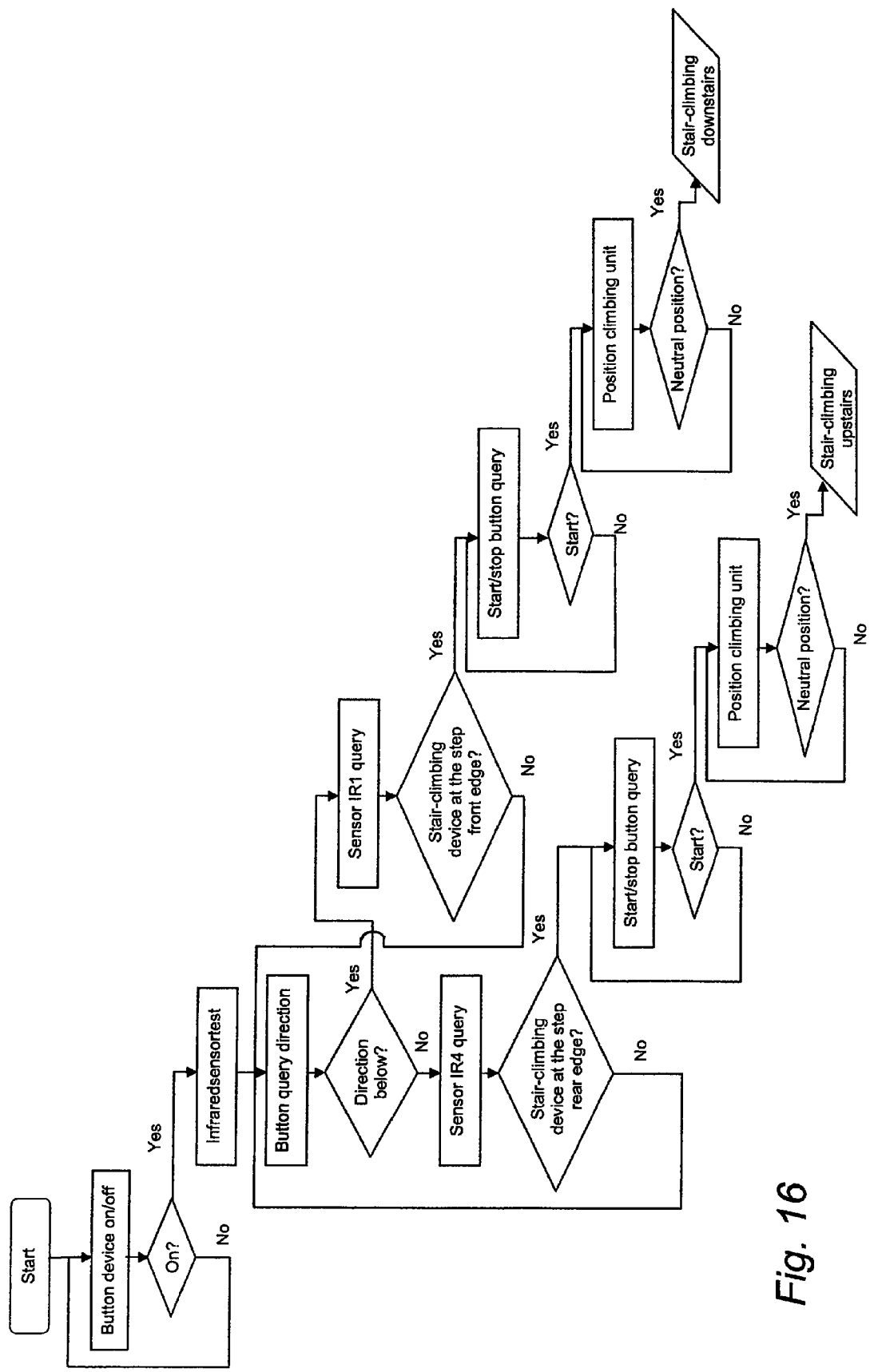
FIG. 16 is flow chart of the mode of operation of the stair-climbing device as a matter of principle.

FIG. 16 shows a schematic flowchart of the above-mentioned functions.

In the following, the functions of the stair-climbing device are explained which relate to an automatic detection of the direction of movement and an automatic start/stop function.

Figure 17:
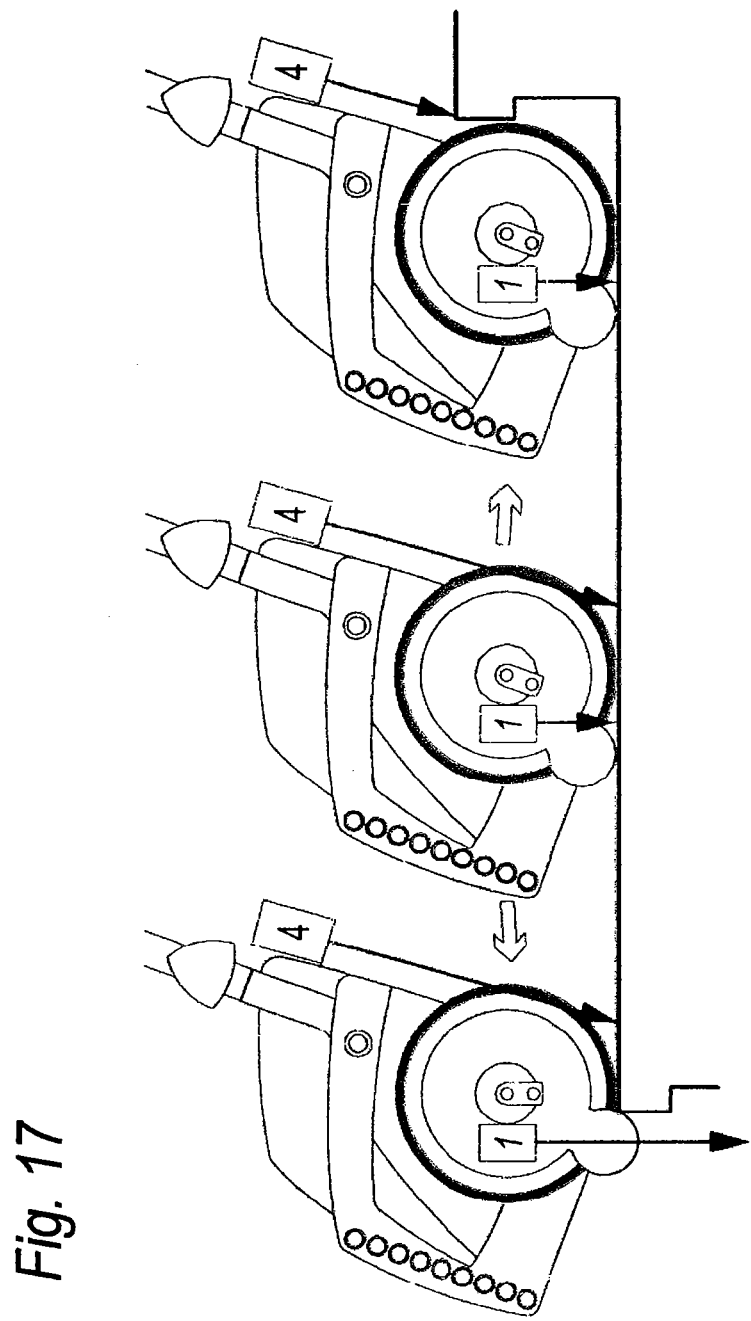
FIG. 17 is a depiction for explanation of the automatic detection of the drive direction.

By means of the automatic direction of movement detection it can, for instance in a neutral position of the running wheels 17, be detected via the sensors in which direction a climbing operation should take place. In this connection, particularly sensors 1 and 4 are involved. As can be taken from the drawing, specifically FIG. 17, sensors 1 and 4 detect the distance to a surface underneath the stair-climbing device. If the running wheels 17 are in a neutral position, as shown in FIG. 17, and the stair-climbing device stands in the middle of a step, as shown in the centre depiction in FIG. 17, that means in a sufficient distance from the front edge of the step as well as of the rear edge thereof, both sensors 1 and 4 detect the distance to the top surface of the step on which the stair-climbing device stands. This value depends on the dimension of the stair-climbing device and the positioning of the sensors attached thereon. A typical value for sensor 1 is for instance 8 cm and a typical value for sensor 4 is 28 cm.

If the stair-climbing device is pushed forward, that means in a direction downstairs to the front edge of a step, as shown in the left depiction in FIG. 17, the front sensor 1 detects the distance to the top surface of the next step further down which, naturally, is considerably larger, namely by the corresponding height of the step, while the distance measured by the rear sensor 4 remains unaltered. The control unit takes therefrom that the desired direction of movement or climbing direction, respectively, must be downstairs. Upon operation of a button of a control device manually initiating the climbing operation (not shown) no direction button has to be operated in such an operation mode including automatic detection of direction of movement, since the drive direction is automatically detected from a position of the stair-climbing device with respect to the step.

If, however, the stair-climbing device is pushed back, that means in a direction upstairs to the rear edge of the step, as shown in the right depiction in FIG. 17, the rear sensor 4 detects the distance to the upper surface of the next higher step which is naturally considerably smaller, namely again by the respective height of the step, while the distance value measured by the front sensor 1 remains unaltered. The control unit takes therefrom that the desired direction of movement or climbing direction, respectively, must be upstairs and controls the climbing unit upon operation of a bottom of the control device manually initiating the climbing operation correspondingly.

The further safety features described above can come into operation in connection with this automatic detection of direction of movement.

Specifically if such combination of safety functions together with an automatic detection of the direction of movement it is possible to realize an automatic start/stop function. This is explained in the following.

If the stair-climbing device has reached a position as shown in FIG. 10a, which corresponds to the left depiction in FIG. 17, the control unit determines from the signals 230 of the respective sensors the direction of movement or the climbing direction, respectively, namely downstairs, as well as the proper and exact positioning which is required for safe conduct of the climbing operation, and automatically initiates the climbing operation downstairs. If, for instance, only the direction of movement would be detected, because sensor 1 detects a respective large distance, however, in accordance with the safety functions as described above, a proper position for a safe climbing operation would not be detected, the automatic start would not be activated.

Concerning the following information of the co-action of the safety functions and the safety features of the stair-climbing device in connection with automatic climbing operation it is again to be noted that each pair of running wheels 17a, 17b, that means both inner running wheels 17b as well as both outer running wheels 17a are provided with respective probing wheels 120. For the purpose of simplified depiction, they are not shown for the inner running wheels in these figures.

In case of the position of the stair-climbing device shown in FIGS. 10a to 10c, in which a climbing operation downstairs takes place, the probing wheels (not shown) for both inner running wheels 17b are in the same position as this is depicted for probing wheel 120 of the right hand outer running wheel 17a in FIG. 10a. This means that the stair-climbing device cannot be pushed forward.

Blocking of the running wheels 17 by the probing wheels 120, however, is only effected in a forward direction, that means in the direction of the probing wheel 120. This means, that during the climbing operation, that means also during the automatic climbing operation downstairs, drawing back of the stair-climbing device is in principle possible. If, however, it is detected here by the sensors, specifically by the front sensor 1, that the stair-climbing device does not have an appropriate position for safe continuation of the climbing operation downstairs, namely specifically in case the stair-climbing device is withdrawn too much, so that the sensor 1 does not detect the large distance to the lower top surface of the step below, but the small distance to the top surface of the step on which the inner running wheels 17b rest, the automatic climbing operation is interrupted. Only if the stair-climbing device is again properly moved to the front edge of the step, the climbing operation is continued to the next step downstairs. In case of this further pushing of the stair-climbing device to the front, the pushing of the stair-climbing device too far is, as already explained, prevented by the fact that also the inner running wheels 17b are provided with probing wheels which, however, are not shown in the figures.

The control unit also can be designed such that an interruption of the climbing operation is no longer performed if the outer running wheels 17a already have a position in which their lowest part already is lower than the top surface of the upper step, like for instance shown in FIG. 10c. In this position it would require a substantial effort to draw the stair-climbing device back so that it is safer to continue the climbing operation as long as the running wheels 17 have reached the next lower step again in a neutral position.

The automatic start/stop function in case of movement upstairs is done essentially in an analog manner. As to this, reference is made to FIGS. 11a to 11c in which the climbing operation upstairs is shown. Also in these figures, the probing wheel 120 of the inner running wheel 17b is not shown in order to simplify the depiction.

At first, in a manner analog to the safety functions as described above, a proper position of the stair-climbing device with respect to the upper step is determined. Specifically, it is determined that the stair-climbing device has a proper inclination angle in the neutral position at the rear edge of the step. Here, particularly sensor 4 detects a distance to the top surface of the upper step which is considerably smaller than the example value of 28 cm mentioned above. In the operational mode allowing the automatic start/stop function, the climbing operation is initiated, automatically and continued only and as long as a proper position is maintained.

From the information concerning the height of the step, which is detected by means of the sensors, additionally the touchdown point of the inner running wheels 17b is calculated. This value represents the position in which the inner pair of wheels 17b touches down on the next higher step.

Sensor 3 serves to measure the distance of the stair-climbing device to the top surface of the step as a function of inclination angle. In case the stair-climbing device should not be in a position in which the inner running wheels 17b can touch down safely on the upper surface of the upper step, the climbing operation is interrupted and continued only if the stair-climbing device is properly positioned.

It is understood that this check can be realized or supported by other or further sensors which are not shown here. Supervision of the distance to the next higher step is particularly important in view of the reason that the outer running wheels 17a which rest on the top surface of the lower step are not secured against rolling in a forward direction during this phase of the climbing movement since the probing wheels 120 also rest on the top surface and the blocking effect of the running wheels 17a in a forward direction is not yet activated in this position. In case the operating person should unintentionally push the stair-climbing device in a forward direction, the supervision of the distance to the backward or higher, respectively, step therefore prevent a malfunction.

It is possible to provide a start/stop button with a safety function which allows that upon touching this button an interruption of the automatic climbing operation is effected. It is further possible that upon re-operation of the button the climbing operation is continued in the direction as initiated.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A stair-climbing device, for use with a wheeled vehicle, comprising
a support unit,
a climbing unit connected to said support unit,
wherein the climbing unit comprises at least one climbing element, which can be driven by a drive motor and is designed such that the climbing unit can get in contact with an upper surface of a next step of a stair and either lift or lower the stair-climbing device on to the next step,
a control unit for controlling operation of the climbing unit, and
a detection unit for detecting a current position of the support unit with respect to one or several steps of the stair, wherein the detection unit comprises at least one non-contact sensor,
wherein the detection unit provides signals to the control unit which signals contain information about the current position of the support unit with respect to one or more steps of the stair, and
wherein the control unit is adapted to control operation of the climbing unit depending on signals of the detection unit.

2. The device as claimed in claim 1, wherein the control unit is adapted to at least one of i) prevent initiation or continuation of the climbing operation and ii) interruption of the climbing operation depending on signals of the detection unit.

3. The device as claimed in claim 1, wherein the control unit is adapted to at least one of i) allow initiation or continuation of the climbing operation, ii) automatically detect a climbing direction, and iii) automatically activate initiation of a climbing operation depending on signals of the detection unit.

4. The device as claimed in claim 1, wherein the control unit is adapted to control the operational speed of the climbing unit depending on signals of the detection unit.

5. The device as claimed in claim 1, wherein the control unit is adapted to reverse the direction of operation of the climbing unit depending on signals of the detection unit.

6. The device as claimed in claim 1, wherein the at least one non-contact sensor is at least three non-contact sensors.

7. The device as claimed in claim 1, wherein the non-contact sensors are arranged in a central portion of said support unit.

8. The device as claimed in claim 7, wherein a first non-contact sensor is disposed in a front portion of said support unit and has a direction of detection extending vertically down, a second non-contact sensor is arranged at the bottom side of the support unit and has a direction of detection extending horizontally, and a third non-contact sensor disposed in a rear portion of the support unit and having a direction of detection extending vertically down.

9. The device as claimed in claim 8, wherein a fourth non-contact sensor is disposed in a rear portion of said support unit and has a direction of detection extending vertically down, wherein the fourth non-contact sensor is disposed below and in front of the third non-contact sensor.

10. The device as claimed in claim 1, wherein the detection unit comprises an inclination angle sensor.

11. The device as claimed in claim 1, wherein the detection unit comprises probing wheels.

12. The device as claimed in claim 1, wherein the detection unit comprises a position determination sensor for determining a specific position of the climbing element.

13. The device as claimed claim 12, wherein the detection unit comprises a count sensor for counting the revolutions of the drive motor.

14. The device as claimed in claim 13, wherein the control unit is adapted to determine the current position of said climbing element from the signals of the position determination sensor and the count sensor.

15. The device as claimed in claim 1, wherein the climbing unit comprises two pairs of running wheels operating as climbing elements, both running wheels of which are rotatably supported with respect to said support unit on a shaft extending parallel to their centre axis.

16. A stair-climbing device, for use with a wheeled vehicle, comprising:
a support unit,
a climbing unit connected to said support unit,
wherein the climbing unit comprises at least one climbing element, which can be driven by a drive motor and is designed such that the climbing unit can get in contact with an upper surface of a next step of a stair and either lift or lower the stair-climbing device on to the next step,
a control unit for controlling operation of the climbing unit, and
a detection unit for detecting a current position of the support unit with respect to one or several steps of the stair, wherein the detection unit comprises at least three non-contact sensors,
wherein the detection unit provides signals to the control unit which signals contain information about the current position of the support unit with respect to one or more steps of the stair;
wherein the control unit is adapted to control operation of the climbing unit depending on signals of the detection unit; and
wherein the non-contact sensors are arranged in a central portion of said support unit.

17. The device as claimed in claim 16, wherein a first non-contact sensor is disposed in a front portion of said support unit and has a direction of detection extending vertically down, a second non-contact sensor is arranged at the bottom side of the support unit and has a direction of detection extending horizontally and a third non-contact sensor disposed in a rear portion of the support unit and having a direction of detection extending vertically down.

18. The device as claimed in claim 17, wherein a fourth non-contact sensor is disposed in a rear portion of said support unit and has a direction of detection extending vertically down, wherein the fourth non-contact sensor is disposed below and in front of the third non-contact sensor.

19. A stair-climbing device, for use with a wheeled vehicle, comprising:
a support unit,
a climbing unit connected to said support unit,
wherein the climbing unit comprises at least one climbing element, which can be driven by a drive motor and is designed such that the climbing unit can get in contact with an upper surface of a next step of a stair and either lift or lower the stair-climbing device on to the next step,
a control unit for controlling operation of the climbing unit, and
a detection unit for detecting a current position of the support unit with respect to one or several steps of the stair, wherein the detection unit comprises at least one non-contact sensor,
wherein the detection unit provides signals to the control unit which signals contain information about the current position of the support unit with respect to one or more steps of the stair;
wherein the control unit is adapted to control operation of the climbing unit depending on signals of the detection unit;
wherein a first non-contact sensor is disposed in a front portion of said support unit and has a direction of detection extending vertically down, a second non-contact sensor is arranged at the bottom side of the support unit and has a direction of detection extending horizontally and a third non-contact sensor disposed in a rear portion of the support unit and having a direction of detection extending vertically down; and
wherein the non-contact sensors are arranged in a central portion of said support unit.

20. The device as claimed in claim 19, wherein a fourth non-contact sensor is disposed in a rear portion of said support unit and has a direction of detection extending vertically down, wherein the fourth non-contact sensor is disposed below and in front of the third non-contact sensor.

* * * * *